United States Patent
Zhao et al.

(10) Patent No.: US 9,307,235 B2
(45) Date of Patent: Apr. 5, 2016

(54) VIDEO ENCODING SYSTEM WITH ADAPTIVE HIERARCHICAL B-FRAMES AND METHOD FOR USE THEREWITH

(71) Applicant: ViXS Systems, Inc., Toronto (CA)

(72) Inventors: Xu Gang Zhao, Maple (CA); John Pomeroy, Markham (CA)

(73) Assignee: ViXS Systems, Inc., Toronto (CA)

(*) Notice: Subject to any disclaimer, the term of this patent is extended or adjusted under 35 U.S.C. 154(b) by 296 days.

(21) Appl. No.: 13/692,388

(22) Filed: Dec. 3, 2012

(65) Prior Publication Data

US 2014/0153639 A1    Jun. 5, 2014

(51) Int. Cl.
| H04N 7/26 | (2006.01) |
|---|---|
| H04N 19/177 | (2014.01) |
| H04N 19/114 | (2014.01) |
| H04N 19/137 | (2014.01) |
| H04N 19/577 | (2014.01) |

(52) U.S. Cl.
CPC ....... *H04N 19/00284* (2013.01); *H04N 19/114* (2014.11); *H04N 19/137* (2014.11); *H04N 19/177* (2014.11); *H04N 19/577* (2014.11)

(58) Field of Classification Search
CPC .......... G06K 9/00805; G06K 9/00818; G08G 1/09626; G08G 1/166; G08G 1/09623; B60W 50/16; B60W 50/14; B60W 2550/22; B60W 2050/143; B60W 2550/30; B60W 30/09; B60W 2550/12; B60W 2520/10; H04N 19/00284; H04N 19/114; H04N 19/137; H04N 19/177; H04N 19/577

See application file for complete search history.

(56) References Cited

U.S. PATENT DOCUMENTS

| 6,647,061 | B1 * | 11/2003 | Panusopone et al. | 375/240.12 |
|---|---|---|---|---|
| 2001/0017887 | A1 * | 8/2001 | Furukawa et al. | 375/240.03 |
| 2002/0009149 | A1 * | 1/2002 | Rodriguez et al. | 375/240.25 |
| 2002/0106022 | A1 * | 8/2002 | Satoh et al. | 375/240.03 |
| 2002/0118747 | A1 * | 8/2002 | Liu et al. | 375/240.04 |
| 2002/0136301 | A1 * | 9/2002 | Yoneyama et al. | 375/240.13 |
| 2003/0021482 | A1 * | 1/2003 | Lan et al. | 382/236 |
| 2003/0031128 | A1 * | 2/2003 | Kim et al. | 370/229 |
| 2003/0039308 | A1 * | 2/2003 | Wu et al. | 375/240.12 |
| 2004/0170395 | A1 * | 9/2004 | Filippini et al. | 386/111 |
| 2005/0100231 | A1 * | 5/2005 | Wang et al. | 382/236 |
| 2005/0123050 | A1 * | 6/2005 | Kondo et al. | 375/240.16 |
| 2005/0175091 | A1 * | 8/2005 | Puri et al. | 375/240.03 |
| 2007/0147512 | A1 * | 6/2007 | Eckart | 375/240.24 |
| 2007/0217702 | A1 * | 9/2007 | Sung | 382/236 |
| 2010/0111162 | A1 * | 5/2010 | Ramachandran | 375/240.01 |
| 2011/0060792 | A1 * | 3/2011 | Ebersviller | 709/203 |

* cited by examiner

*Primary Examiner* — Jay Patel
*Assistant Examiner* — Joseph Suh
(74) *Attorney, Agent, or Firm* — Garlick & Markison; Bruce E. Stuckman

(57) ABSTRACT

A device encodes a video signal having a sequence of images into an encoded video signal. The device includes a group of picture (GOP) adaption module that detects a high complexity scene in the sequence of images and that generates GOP adaption data indicating the high complexity scene when the high complexity scene is detected. An encoding module generates the encoded video signal with hierarchical B frames disabled when the GOP adaption data indicates the high complexity scene.

10 Claims, 5 Drawing Sheets

VIDEO ENCODING SYSTEM WITH ADAPTIVE HIERARCHICAL B-FRAMES AND METHOD FOR USE THEREWITH

CROSS REFERENCE TO RELATED PATENTS

None

TECHNICAL FIELD OF THE INVENTION

The present invention relates to video encoding used in devices such as video processing devices.

DESCRIPTION OF RELATED ART

Video encoding has become an important issue for modern video processing devices. Robust encoding algorithms allow video signals to be transmitted with reduced bandwidth and stored in less memory. Standards have been promulgated for many encoding methods including the H.264 standard that is also referred to as MPEG-4, part 10 or Advanced Video Coding, (AVC). A group of pictures (GOP) in AVC is composed of one key frame and hierarchically structured B-frames. This can result in a complex inter-frame dependency structure that requires greater memory requirements. In addition, while standards set forth many powerful techniques, further improvements are possible in the performance and the speed of implementation of such methods. The accuracy of these encoding methods face the scrutiny of users that are becoming accustomed to higher resolution and better picture quality.

Further limitations and disadvantages of conventional and traditional approaches will become apparent to one of ordinary skill in the art through comparison of such systems with the present invention.

DETAILED DESCRIPTION OF THE INVENTION INCLUDING THE PRESENTLY PREFERRED EMBODIMENTS

Figure 1:
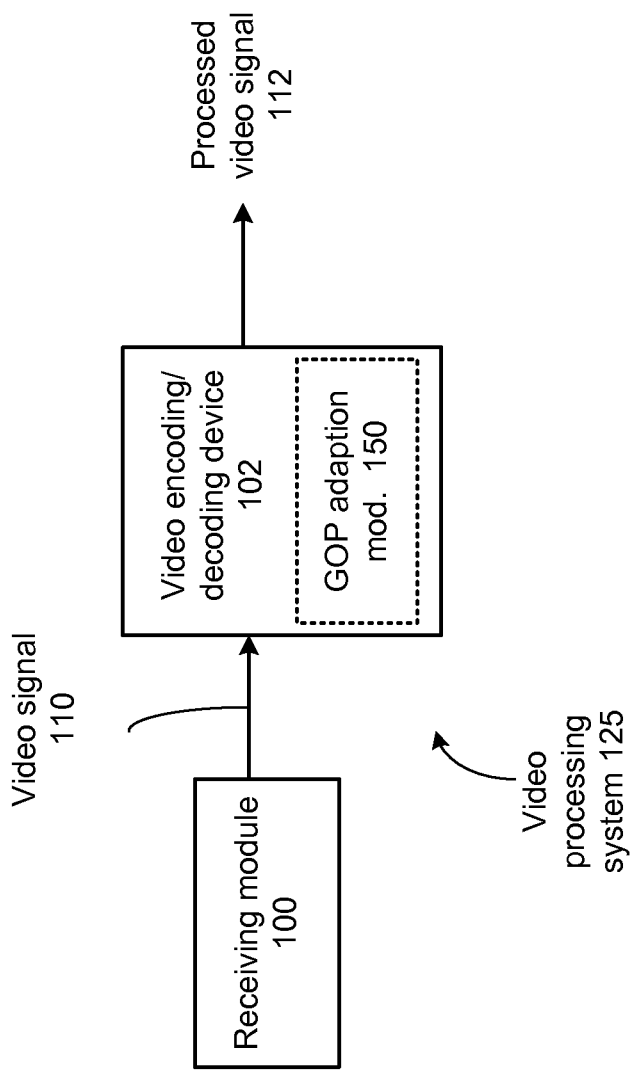
FIG. 1 presents a block diagram representation of a video processing system 125 in accordance with an embodiment of the present invention.

FIG. 1 presents a block diagram representation of a video processing system 125 in accordance with an embodiment of the present invention. In particular, video processing system 125 includes a receiving module 100, such as a set-top box, television receiver, personal computer, cable television receiver, satellite broadcast receiver, broadband modem, 3G transceiver or other information receiver or transceiver that is capable of receiving a video signal 110 from one or more sources such as a broadcast cable system, a broadcast satellite system, the Internet, a digital video disc player, a digital video recorder, or other video source. Video encoding/decoding device 102 is coupled to the receiving module 100 to encode and/or transcode the video signals 110 to form processed video signal 112.

In an embodiment of the present invention, the video signal 110 can include a broadcast video signal, such as a television signal, high definition television signal, enhanced high definition television signal or other broadcast video signal that has been transmitted over a wireless medium, either directly or through one or more satellites or other relay stations or through a cable network, optical network or other transmission network. In addition, the video signal 110 can be generated from a stored video file, played back from a recording medium such as a magnetic tape, magnetic disk or optical disk, and can include a streaming video signal that is transmitted over a public or private network such as a local area network, wide area network, metropolitan area network or the Internet.

Video signal 110 and/or processed video signal 112 can each be encoded in accordance with a digital video format such as H.264, MPEG-4 Part 10 Advanced Video Coding (AVC) or other digital format with hierarchical B frames such as a Moving Picture Experts Group (MPEG) format, Quicktime format, Real Media format, Windows Media Video (WMV) or Audio Video Interleave (AVI), or another digital video format, either standard or proprietary.

The video encoding/decoding device 102 includes a group of picture (GOP) adaption module 150 that helps reduce the memory bandwidth consumption when encoding video streams with hierarchical B frames. The GOP adaption module 150 takes advantage of the fact that hierarchical B frames deliver the most improvement in video quality in encoded video, such as AVC encoded video, in relatively low complexity scenes with slow moving or low detail objects making up much of the image. The adaptive GOP module 150 generates GOP adaption data indicating the scene complexity. The video encoding/decoding device 102 disables hierarchical B frames during high complexity scenes where the benefits would be small, but the use of memory bandwidth could be high. The video encoding/decoding device 102 then re-enables hierarchical B frames during scenes of low complexity where the use of these frames yields the most benefit and where memory bandwidth consumption is naturally much lower. In this fashion, the adaptive GOP module 150 provides real-time adaption of GOP on a picture by picture or scene by scene basis in a video.

The operation of adaptive GOP module 150 will be described in greater detail, including many optional functions and features, in conjunction with FIGS. 2-5 that follow.

Figure 2:
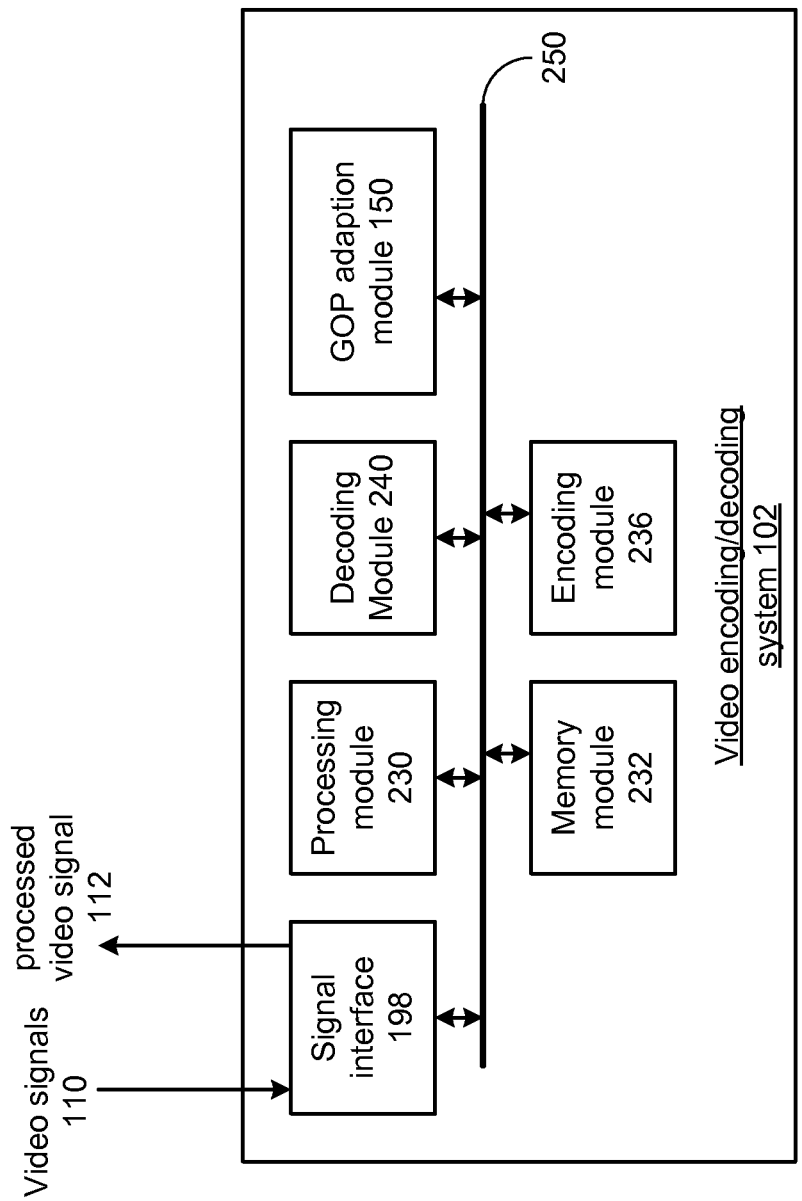
FIG. 2 presents a block diagram representation of a video encoding/decoding device 102 in accordance with an embodiment of the present invention.

FIG. 2 presents a block diagram representation of a video encoding/decoding device 102 in accordance with an embodiment of the present invention. In particular, video encoding/decoding device 102 operates in accordance with many of the functions and features of the H.264 standard, but with hierarchical B frames being selectively enabled or disabled. Other encoding schemes that employ hierarchical B frames can likewise be used. While the MPEG-4, part 2 standard, VC-1 (SMPTE standard 421M), and MPEG-2 standards do not currently support hierarchical B frames, to the extent that these standards are revised or amended to include support for hierarchical B frames, video encoding/decoding device 102 could likewise operate using these standards. In operation, video encoding/decoding device 102 encodes and/or transcodes video input signals 110 that are received via a signal interface 198 and output as processed video signal 112.

The video transcoding device 102 includes signal interface 198, processing module 230, and GOP adaption module 150.

The processing module 230 can be implemented using a single processing device or a plurality of processing devices. Such a processing device may be a microprocessor, co-processors, a micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions that are stored in a memory, such as memory module 232. Memory module 232 may be a single memory device or a plurality of memory devices. Such a memory device can include a hard disk drive or other disk drive, read-only memory, random access memory, volatile memory, non-volatile memory, static memory, dynamic memory, flash memory, cache memory, and/or any device that stores digital information. Note that when the processing module implements one or more of its functions via a state machine, analog circuitry, digital circuitry, and/or logic circuitry, the memory storing the corresponding operational instructions may be embedded within, or external to, the circuitry comprising the state machine, analog circuitry, digital circuitry, and/or logic circuitry.

Processing module 230, and memory module 232 are coupled, via bus 250, to the signal interface 198 and a plurality of other modules, such as the GOP adaption module 150, decoding module 240 and encoding module 236. The modules of video encoding/decoding device 102 can be implemented in software, firmware or hardware, depending on the particular implementation of processing module 230. It should also be noted that the software implementations of the present invention can be stored on a tangible storage medium such as a magnetic or optical disk, read-only memory or random access memory and also be produced as an article of manufacture. While a particular bus architecture is shown, alternative architectures using direct connectivity between one or more modules and/or additional buses can likewise be implemented in accordance with the present invention.

While video encoding system can operate to merely encode an unencoded video signal 110 into processed video signal 112 via encoding module 236, video encoding/decoding device 102 can optionally operate by decoding the video signal 110 via decoding module 240 and re-encoding the decoded result via encoding module 236 to produce a processed video signal 112 that is transcoded from the video compression format of video signal 110 to the video compression format of processed video signal 112. This transcoding can include transcaling, transrating and/or changes in the compression format itself, etc. Further, decoding module 240 and encoding module 236 can alternatively cooperate to otherwise utilize parameters of an encoded video signal 110 to transform the video signal 110 into a transcoded format of processed signal 112. In particular, similarities between the format of the video signal 110 and the processed video signal 112 can be leveraged to reduce the amount of computation required and to avoid a full decoding and re-encoding.

GOP adaption module 150 detects high scene complexity and/or low scene complexity in the sequence of images, such as frames and/or fields of video signal 110. In particular, a scene complexity is generated for images in the sequence of images. As used herein, scenes with low scene complexity are characterized by unified motions for the objects in pictures. For example, a panning scene with a forest (which includes a complex image) has low complexity because the motion is simple. Examples of high scene complexity include explosions, waterfalls, etc. that are characterized by objects moving in different directions at the same time.

The GOP adaption module 150 compares the scene complexity to a scene complexity threshold and detects a low scene complexity when the scene complexity compares favorable, (e.g. is less than) the scene complexity threshold. The GOP adaption module 150 detects a high scene complexity when the scene complexity compares unfavorably to (e.g. is greater than) the scene complexity threshold. In operation, the GOP adaption module 150 generates GOP adaption data, such as a flag, logic variable or other data that indicates either a high scene complexity or a low scene complexity. The encoding module 236 generates the processed video signal with hierarchical B frames disabled when the GOP adaption data indicates a high complexity scene. The encoding module 236 generates the processed video signal with hierarchical B frames enabled when the GOP adaption data indicates a low complexity scene.

The operation of the GOP adaption module 150 can de described in conjunction with the following example. Consider the case where video signal 110 is being encoded into an AVC processed video signal 112. GOP adaption module 150 can use encoding parameters such as picture level statistics from the video signal 112, to determine a scene complexity.

For example, scene complexity can be characterized based on the number of bits used in an image, b; variance values, var, for some or all of the macroblocks of the image; and quantization step values (QP). A scene complexity for the ith image, $C_i$, can be determined by combining these parameters effectively in the form of a function, $f$:

$$C_i = \theta(b, \text{var}, QP)$$

A weighted linear function of these three parameters can be employed, with weighting coefficients chosen to normalize the particular parameters or otherwise generated based on experimental results. Alternatively, a nonlinear function can likewise be employed.

In addition, GOP adaption module 150 can determine an average scene complexity, C, over a plurality of images in the sequence of images. For instance, the average scene complexity can be determined as follows:

$$C = \Sigma(C_i)_{i=(n-k) \text{ to } (n-1)}$$

In this fashion, the average scene complexity can be determined based on a moving average of the previous k images. The GOP adaption module 150 can detect a high scene complexity by comparing the scene complexity to a scene complexity threshold. In particular, the GOP adaption module 150 can detect a high complexity scene when the scene complexity compares unfavorably to the scene complexity threshold, SCT, such as when:

$$|C| > SCT$$

The scene complexity threshold can be determined experimentally based on the analysis of actual scenes of differing complexities that would undesirably increase memory bandwidth consumption and/or provide margin increase in picture quality if hierarchical B-frames are still enabled. In an embodiment of the present invention, the GOP adaption module 150 generates the scene complexity C based on analysis of only the I-type images (I pictures) and P-type images (P pictures) of the video signal 112.

In a further example, the GOP adaption module can be employed during a transcoding of video signal 110 that employs only a partial decoding. For example a video signal 110 in MPEG-2 can be transcoded into a processed video signal 112 in AVC format. In this further example, picture level statistics from the video signal 110, i.e. MPEG-2 picture statistics can be analyzed by GOP adaption module 150 to detect high or low scene complexity, C. In response to the high or low complexity of video signal 110, the AVC encoding to produce processed video signal 112 can be selectively disabled or enabled.

Figure 3:
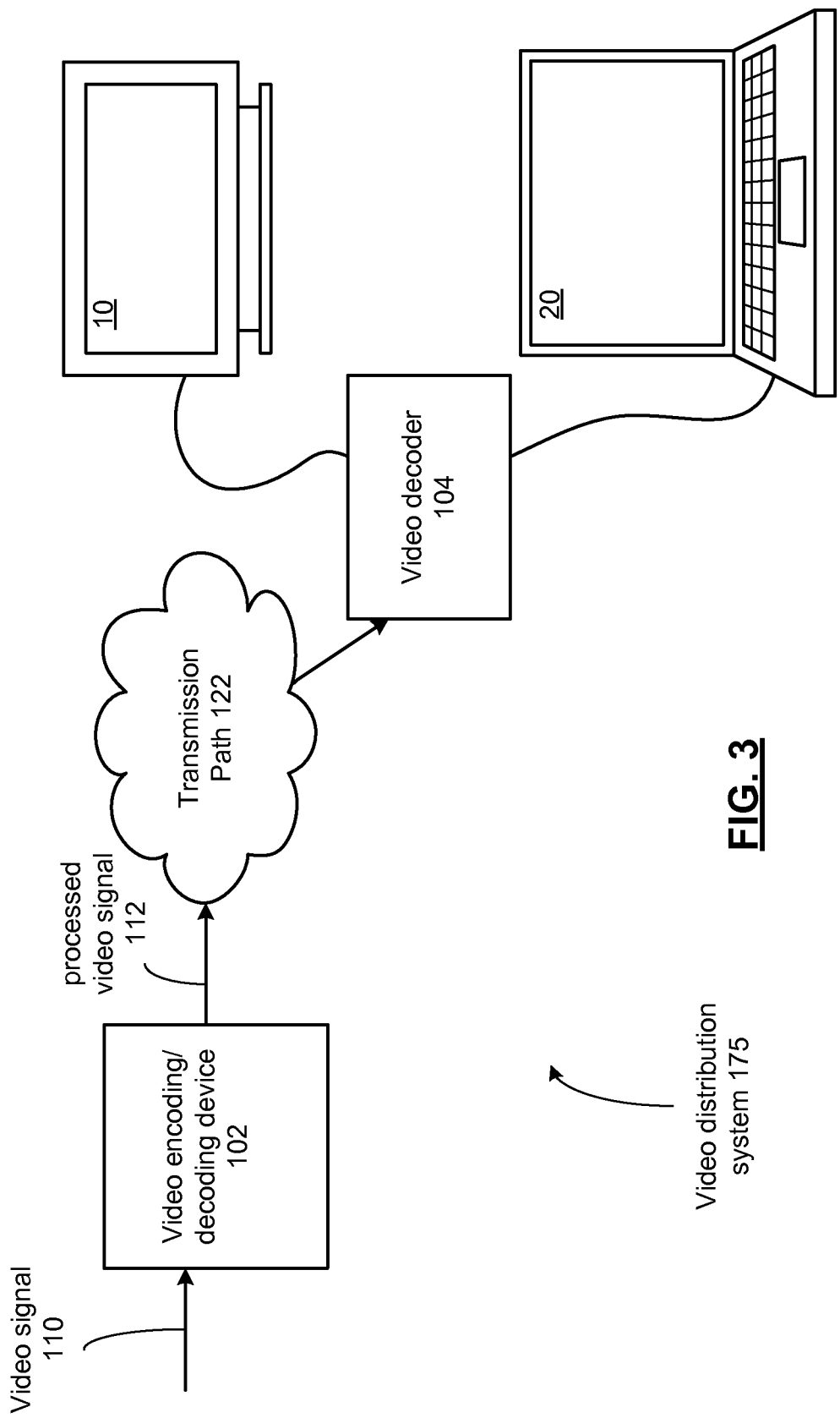
FIG. 3 presents a block diagram representation of a video distribution system 175 in accordance with an embodiment of the present invention.

FIG. 3 presents a block diagram representation of a video distribution system 175 in accordance with an embodiment of the present invention. In particular, processed video signal 112 is transmitted via a transmission path 122 to a video decoder 104. Video decoder 104, in turn can operate to decode the processed video signal 112 for display on a display device such as television 10, computer 20 or other display device.

The transmission path 122 can include a wireless path that operates in accordance with a wireless local area network protocol such as an 802.11 protocol, a WIMAX protocol, a Bluetooth protocol, etc. Further, the transmission path can include a wired path that operates in accordance with a wired protocol such as a Universal Serial Bus protocol, an Ethernet protocol or other high speed protocol.

Figure 4:
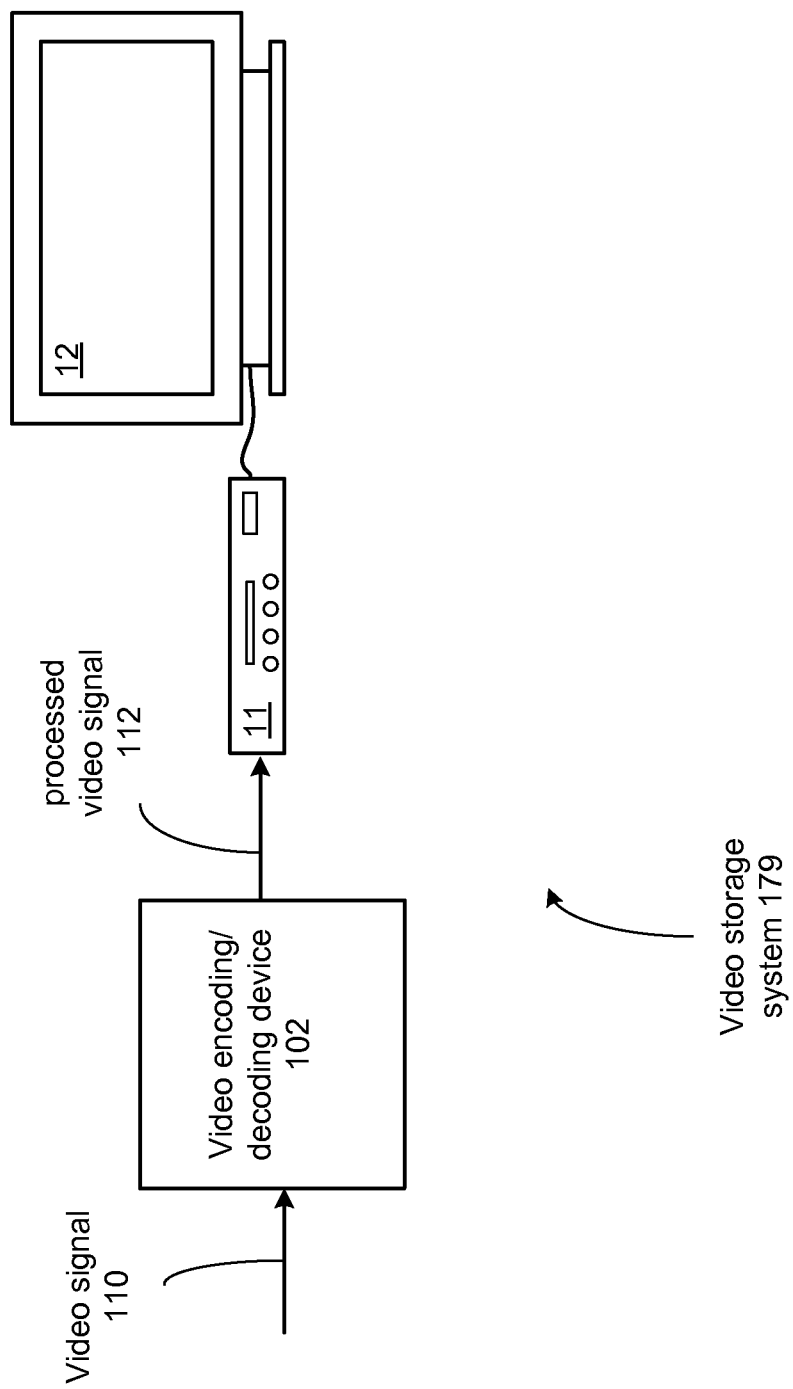
FIG. 4 presents a block diagram representation of a video storage system 179 in accordance with an embodiment of the present invention.

FIG. 4 presents a block diagram representation of a video storage system 179 in accordance with an embodiment of the present invention. In particular, device 11 is a set top box with built-in digital video recorder functionality, a stand alone digital video recorder, a DVD recorder/player or other device that stores the transcoded video signal 112 for display on video display device such as television 12. While video encoder/decoder device 102 is shown as a separate device, it can further be incorporated into device 11. While these particular devices are illustrated, video storage system 179 can include a hard drive, flash memory device, computer, DVD burner, or any other device that is capable of generating, storing, decoding and/or displaying the processed video signal 112 in accordance with the methods and systems described in conjunction with the features and functions of the present invention as described herein.

Figure 5:
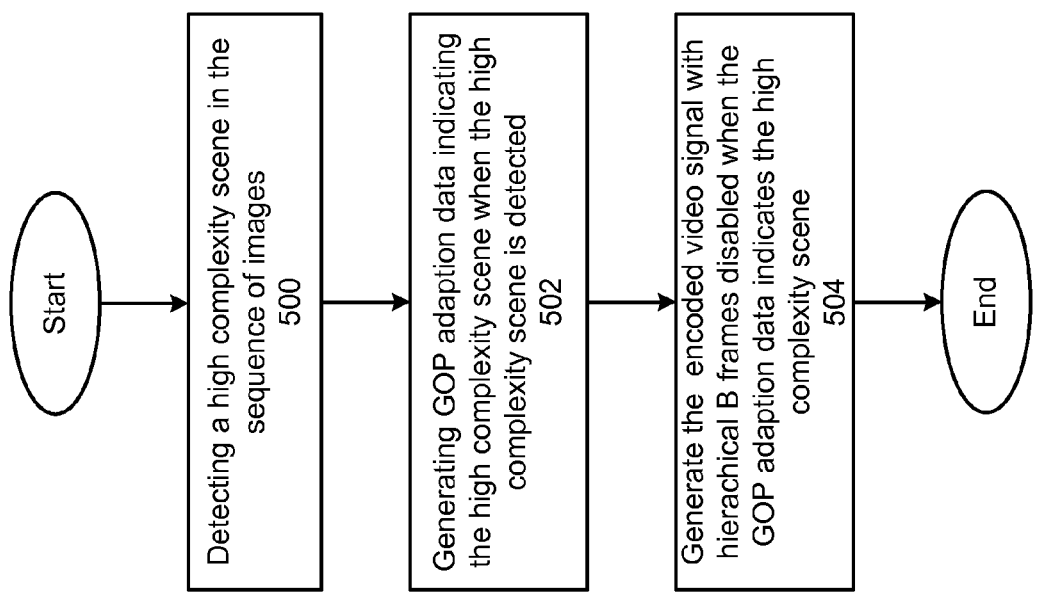
FIG. 5 presents a flowchart representation of a method in accordance with an embodiment of the present invention.

FIG. 5 presents a flowchart representation of a method in accordance with an embodiment of the present invention. In particular a method is presented for use in conjunction with one or more functions and features described in conjunction with FIGS. 1-5. In step 500, a high complexity scene is detected in a sequence of images. In step 502, GOP adaption data is generated indicating the high complexity scene when the high complexity scene is detected. In step 504, an encoded video signal is generated with hierarchical B frames disabled when the GOP adaption data indicates the high complexity scene.

The method can further include detecting a low complexity scene in the sequence of images and that generates GOP adaption data indicating the low complexity scene when the low complexity scene is detected and generating the encoded video signal with hierarchical B frames enabled when the GOP adaption data indicates the low complexity scene. In step 500, the high scene complexity can be detected by comparing a scene complexity to a scene complexity threshold.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "operably coupled to", "coupled to", and/or "coupling" includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item. As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

As may also be used herein, the terms "processing module", "processing circuit", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

The present invention has been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

The present invention may have also been described, at least in part, in terms of one or more embodiments. An embodiment of the present invention is used herein to illustrate the present invention, an aspect thereof, a feature thereof, a concept thereof, and/or an example thereof. A physical embodiment of an apparatus, an article of manufacture, a machine, and/or of a process that embodies the present invention may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of the various embodiments of the present invention. A module includes a processing module, a functional block, hardware, and/or software stored on memory for performing one or more functions as may be described herein. Note that, if the module is implemented via hardware, the hardware may operate independently and/or in conjunction software and/or firmware. As used herein, a module may contain one or more sub-modules, each of which may be one or more modules.

While particular combinations of various functions and features of the present invention have been expressly described herein, other combinations of these features and functions are likewise possible. The present invention is not limited by the particular examples disclosed herein and expressly incorporates these other combinations.

What is claimed is:

1. A device for encoding a video signal into an encoded video signal, the video signal including a sequence of images, the device comprising:
   a group of picture (GOP) adaption module that detects a high complexity scene in the sequence of images and that generates GOP adaption data indicating the high complexity scene when the high complexity scene is detected and that further detects a low complexity scene in the sequence of images and that generates the GOP adaption data indicating the low complexity scene when the low complexity scene is detected, wherein the GOP adaption module compares a scene complexity to a scene complexity threshold and detects the low scene complexity when the scene complexity compares favorably to the scene complexity threshold, and wherein the low scene complexity corresponds to more unified motion direction relative to the high scene complexity; and
   an encoding module, coupled to the GOP adaption module, that generates the encoded video signal with B frames that do not reference other B frames when the GOP adaption data indicates the high complexity scene and with at least one B frame that references another B frame when the GOP adaption data indicates the low complexity scene.

2. The device of claim 1 wherein the encoding module generates the encoded video signal based on at least one encoding parameter and wherein the GOP adaption module detects the high complexity scene in the sequence of images based on an analysis of the at least one encoding parameter.

3. The device of claim 2 wherein the at least one encoding parameter includes a number of bits used to encode at least one image of the sequence of images.

4. The device of claim 3 wherein the at least one encoding parameter includes an average variance of a plurality of macroblocks in at least one image of the sequence of images.

5. The device of claim 3 wherein the at least one encoding parameter includes a quantization step value.

6. The device of claim 1 wherein the GOP adaption module detects the high scene complexity when the scene complexity compares unfavorably to the scene complexity threshold.

7. The device of claim 6 wherein the GOP adaption module generates the scene complexity based on a moving average of scene complexities corresponding to a plurality of images in the sequence of images.

8. The device of claim 1 wherein the GOP adaption module detects the high scene complexity based on only I-type images and P-type images of the sequence of images.

9. A method for encoding a video signal into an encoded video signal, the video signal including a sequence of images, the method comprising:
   detecting a high complexity scene in the sequence of images and generating GOP adaption data indicating the high complexity scene when the high complexity scene is detected;
   detecting a low complexity scene in the sequence of images by comparing a scene complexity to a scene complexity threshold and detecting the low scene complexity when the scene complexity compares favorably to the scene complexity threshold, wherein the low scene complexity corresponds to more unified motion direction relative to the high scene complexity;
   generating the GOP adaption data indicating the low complexity scene when the low complexity scene is detected; and generating the encoded video signal with B frames that do not reference other B frames when the GOP adaption data indicates the high complexity scene and with at least one B frame that references another B frame when the GOP adaption data indicates the low complexity scene.

10. The method of claim 9 wherein the high scene complexity is detected when the scene complexity compares unfavorably to the scene complexity threshold.

* * * * *